United States Patent
Wang et al.

(10) Patent No.: US 12,216,905 B2
(45) Date of Patent: Feb. 4, 2025

(54) WRITE BOOSTER BUFFER FLUSH OPERATION

(71) Applicant: Micron Technology, Inc., Boise, ID (US)

(72) Inventors: Xing Wang, Shanghai (CN); Wenyu Li, Shanghai (CN); Xiaolai Zhu, Shanghai (CN); Xu Zhang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/632,099

(22) PCT Filed: Mar. 19, 2021

(86) PCT No.: PCT/CN2021/081755
§ 371 (c)(1),
(2) Date: Sep. 22, 2022

(87) PCT Pub. No.: WO2022/193270
PCT Pub. Date: Sep. 22, 2022

(65) Prior Publication Data
US 2023/0376206 A1    Nov. 23, 2023

(51) Int. Cl.
*G06F 3/06* (2006.01)
(52) U.S. Cl.
CPC .......... *G06F 3/0613* (2013.01); *G06F 3/0656* (2013.01); *G06F 3/0679* (2013.01)
(58) Field of Classification Search
CPC ..... G06F 3/0613; G06F 3/0656; G06F 3/0679
See application file for complete search history.

(56) References Cited

U.S. PATENT DOCUMENTS

2013/0198447 A1    8/2013  Yochai et al.
2016/0077968 A1*   3/2016  Sela ................. G06F 12/0246
                                                           711/118

(Continued)

FOREIGN PATENT DOCUMENTS

CN    109313620 A    5/2017
CN    111352581 A    12/2019
CN    111625188 A    5/2020

OTHER PUBLICATIONS

ISA/CN, "International Search Report and Written Opinion of the International Searching Authority," issued in connection with Int'l Appl. No. PCT/CN2021/081755, dated Dec. 14, 2021 (8 pages).

*Primary Examiner* — Michael Krofcheck
*Assistant Examiner* — Janice M. Girouard
(74) *Attorney, Agent, or Firm* — Holland & Hart LLP

(57) ABSTRACT

Techniques are described herein for performing a flush operation for a write booster buffer of a memory system. The flush operation may include swapping valid blocks in the write booster buffer for invalid blocks in a storage space of the memory system. After swapping the blocks, the memory system may transfer the information from a first type of blocks that were formerly assigned to the write booster buffer to a second type of blocks in the storage space. In such a flush operation, space is made available in the write booster buffer with less latency than it would take to transfer information between blocks, thereby improving the performance of the write booster mode.

25 Claims, 6 Drawing Sheets

(56) References Cited

U.S. PATENT DOCUMENTS

| | | | |
|---|---|---|---|
| 2017/0371794 A1* | 12/2017 | Kan | G06F 3/061 |
| 2018/0004454 A1 | 1/2018 | Sampathkumar et al. | |
| 2018/0129440 A1* | 5/2018 | Bandic | G06F 3/0679 |
| 2019/0042444 A1* | 2/2019 | Natarajan | G06F 12/0871 |
| 2019/0095116 A1* | 3/2019 | Igahara | G06F 3/0604 |
| 2021/0064249 A1* | 3/2021 | Mehta | G06F 11/1048 |

* cited by examiner

WRITE BOOSTER BUFFER FLUSH OPERATION

CROSS REFERENCE

The present application for patent is a 371 national phase filing of International Patent Application No. PCT/CN2021/081755 by Wang et al., entitled "WRITE BOOSTER BUFFER FLUSH OPERATION," filed Mar. 19, 2021, assigned to the assignee hereof, and expressly incorporated by reference herein.

FIELD OF TECHNOLOGY

The following relates generally to one or more systems for memory and more specifically to write booster buffer flush operation.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A memory system may be configured to store information using a write booster mode. When using a write booster mode, the memory system may store information associated with write commands from the host system into a write booster buffer that includes a plurality of blocks. When the write booster buffer becomes full or the information stored there exceeds a threshold, a flush operation may be performed to move the information from the write booster buffer to a storage space of the memory system. Such a flush operation may take time and computational resources of one or more components of the memory system. For example, reading data from the blocks of the write booster buffer and then writing the data into blocks in the storage space may take time. In some cases, the memory system may not be able to completely empty the write booster buffer. Later, when the host system sends a write command for the memory system to use a write booster mode, the write booster buffer may be full and the memory system may not be capable of writing the information using the write booster mode because of this.

Techniques are described herein for performing a flush operation for a write booster buffer of the memory system. The flush operation may be configured to make space in the write booster buffer without waiting for the information stored in the write booster buffer to be transferred from blocks of the write booster buffer to the blocks of the storage space. The flush operation may include swapping (e.g., updating an assignment of) valid blocks in the write booster buffer for invalid blocks in the storage space. After swapping the blocks, the memory system may transfer the information from a first type of blocks that were formerly assigned to the write booster buffer to a second type of blocks in the storage space. In such a flush operation, space is made available in the write booster buffer faster (e.g., with less latency) than making space available otherwise would take to transfer information between blocks, thereby improving the performance of the write booster mode, among other advantages.

Features of the disclosure are described in the context of systems, process diagrams, and a flowchart with reference to FIGS. 1-4. These and other features of the disclosure are further illustrated by and described in the context of an apparatus diagram and a flowchart that relate to write booster buffer flush operation with reference to FIGS. 5-6.

Figure 1:
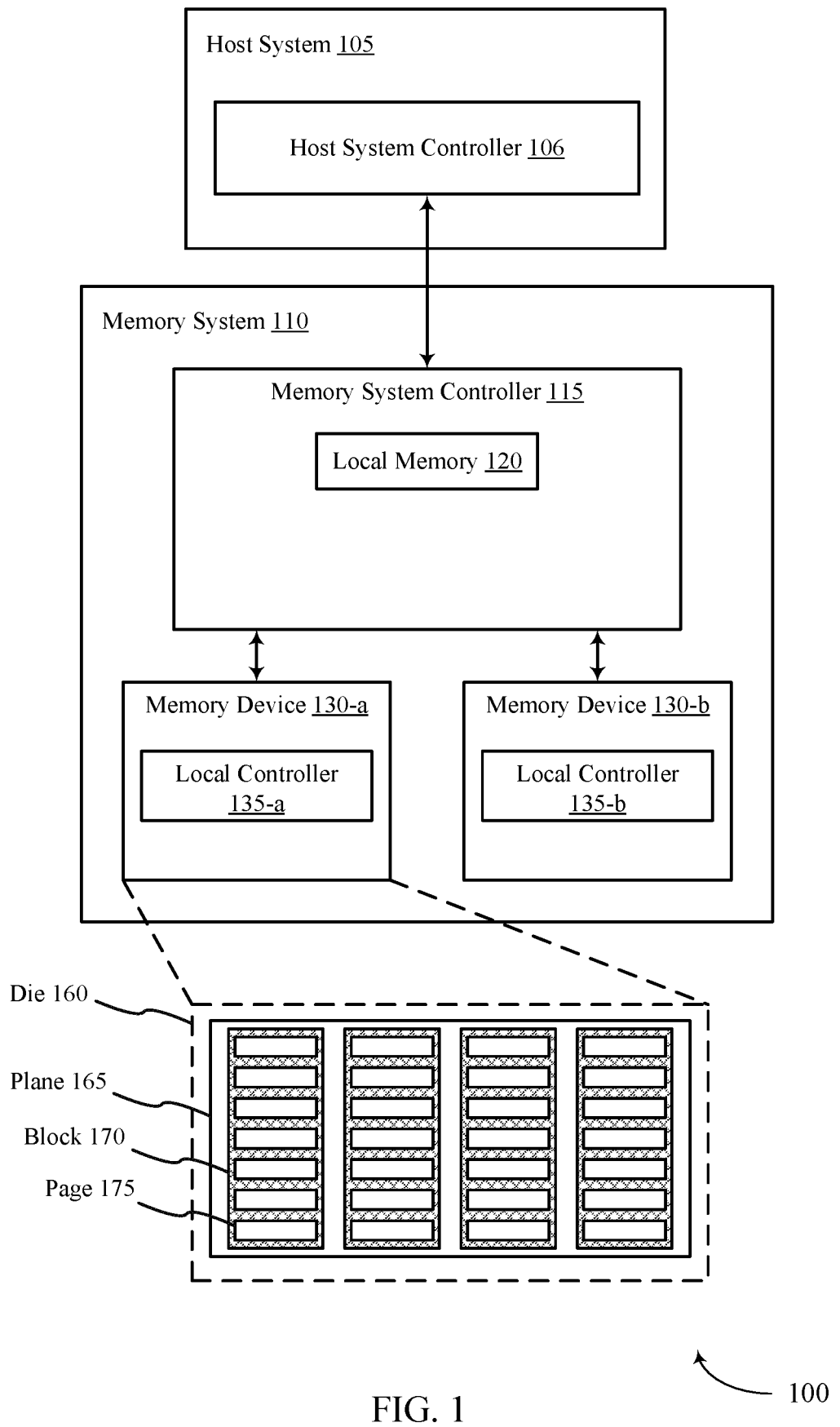
FIG. 1 illustrates an example of a system that supports write booster buffer flush operation in accordance with examples as disclosed herein.

FIG. 1 illustrates an example of a system 100 that supports write booster buffer flush operation in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and validity tables may be maintained that may indicate data as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105). In some cases, a memory management operation (such as a garbage collection operation) may be used to transfer data from an SLC block to a TLC block. For example, a memory system that is using a write booster mode may initially write data to an SLC block to reduce a latency for performing the write operation. Later, the memory system transfer the data in the SLC blocks to TLC blocks to improve the density of the data storage in the memory system.

The system 100 may include any quantity of non-transitory computer readable media that support write booster buffer flush operation. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

Techniques are described herein for performing a flush operation for a write booster buffer of the memory system 110. The flush operation may be configured to make space in the write booster buffer without waiting for the information stored in the write booster buffer to be transferred from blocks of the write booster buffer to the blocks of the storage space. The flush operation may include swapping valid blocks in the write booster buffer for invalid blocks in the storage space. After swapping the blocks, the memory system 110 may transfer the information from a first type of blocks (e.g., SLC blocks) that were formerly assigned to the write booster buffer to a second type of blocks (e.g., TLC blocks) in the storage space. In such a flush operation, space is made available in the write booster buffer with less latency than it would take to transfer information between blocks, thereby improving the performance of the write booster mode.

Figure 2:
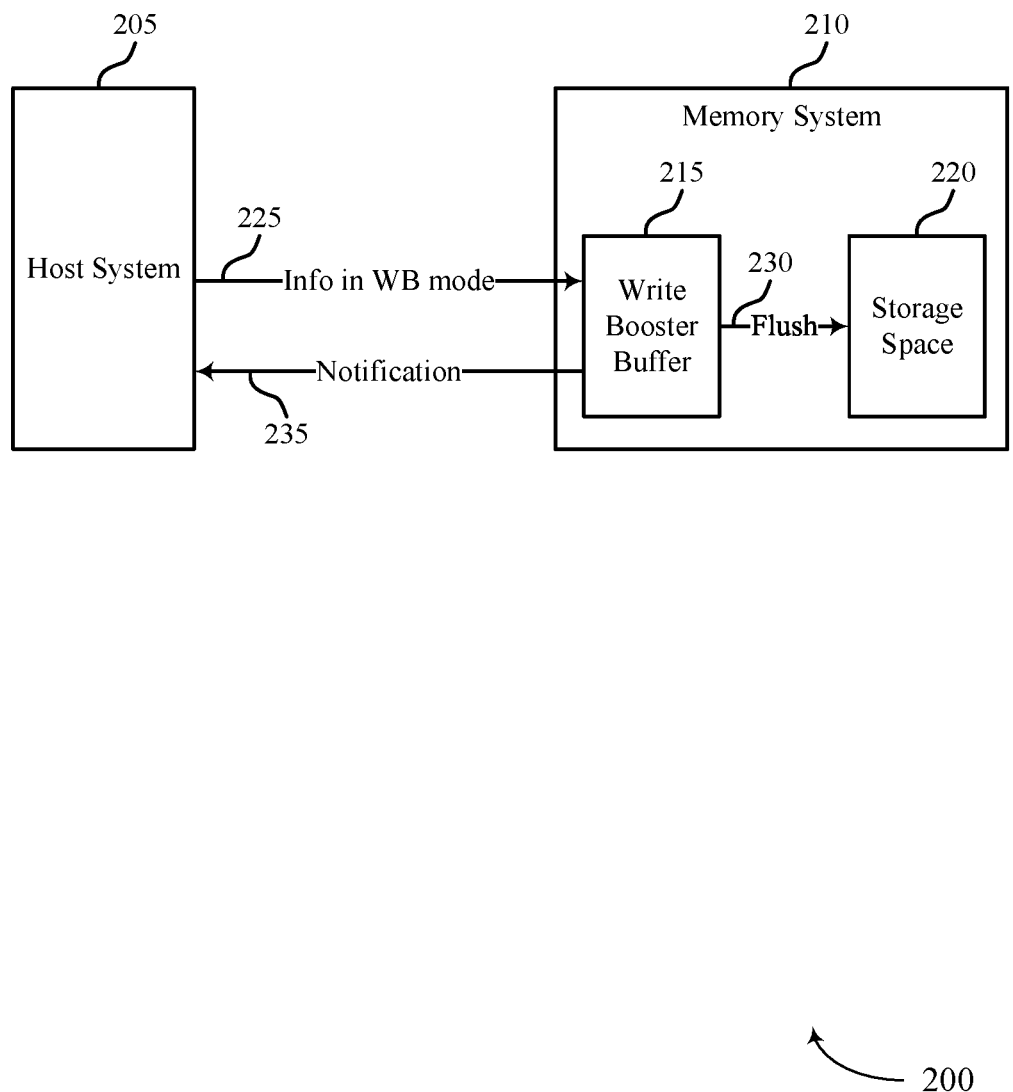
FIG. 2 illustrates an example of a system that supports write booster buffer flush operation in accordance with examples as disclosed herein.

FIG. 2 illustrates an example of a system 200 that supports write booster buffer flush operation in accordance with examples as disclosed herein. The system 200 may be an example of a system 100 as described with reference to FIG. 1 or aspects thereof. The system 200 may include a host system 205 and a memory system 210. The host system 205 may be an example of the host system 105 described with reference to FIG. 1. The memory system 210 may be an example of the memory system 110 described with reference to FIG. 1.

The memory system 210 may be configured with one or more memory devices (e.g., NAND memory devices) that provide non-volatile storage of information associated with the host system 205. The memory system 210 may partition the one or more memory devices to perform different functions. Example of the partitions may include assigning some blocks (or virtual blocks) of NAND memory to perform some functions and other blocks (or virtual blocks) of NAND memory to perform other functions. Examples of two such functions may include a write booster buffer 215 and a storage space 220.

The write booster buffer 215 may be configured with a plurality of blocks to store information from the host system 205 that is written using a write booster mode. The plurality of blocks of the write booster buffer 215 may be configured as SLC blocks to improve the speed of writing the information.

The storage space 220 may be configured with a plurality of blocks to store any information from the host system 205 or associated with host system 205. The plurality of blocks of the storage space 220 may be configured as blocks with any type of memory cell (e.g., SLC blocks, MLC blocks, TLC blocks, QLC blocks, etc.). In some examples, the plurality of blocks of the storage space 220 may be configured as TLC blocks to improve the density of information stored in a block, as compared with SLC blocks.

The write performance of TLC block in NAND memory is may be slower than an SLC block in NAND memory because the logically defined TLC bits may use more programming steps and may have higher error correction probability. To improve the write performance, part of the blocks in the storage space 220 (e.g., normal storage) may be configured as SLC blocks and used as write booster buffer, temporarily or permanently for a write booster mode. Using SLC blocks as the write booster buffer 215 may enable the write command to be processed with lower latency and may improve the overall write performance. Some portions of blocks allocated for the storage space (e.g., user area) may be assigned or allocated as the write booster buffer 215. The data written in the write booster buffer 215 can be flushed (e.g., transferred) into storage space 220 by an explicit command from the host system 205 or implicitly while the memory system 210 is in hibernate state or in an idle state. Different types of blocks (e.g., SLC blocks, MLC blocks, TLC blocks, QLC blocks, etc.) or different combination so block types (e.g., SLC & MLC, SLC & QLC, MLC & TLC, MLC & QLC, or TLC & QLC) may be used for the write booster buffer 215 or the storage space 220.

In some examples, there may be two types of write booster mode of operations: a logical unit (LU) dedicated buffer mode and a shared buffer mode, etc. In the LU dedicated buffer mode, the write booster buffer 215 may be dedicated to a logical unit, while in the shared buffer mode the logical units may share the same write booster buffer 215. In both write booster mode of operations, the size of write booster buffer 215 may be configurable. In some examples, there may be two configuration options: a user space reduction option and a preserve user space option. The user space reduction option may reduce the total space (e.g., blocks) in the storage space 220 that can be configured at provisioning. The preserve user space option may avoid a reduction of the total space (e.g., blocks) that can be configured at provisioning, but the preserve user space option may result in a lower performance for the write booster mode. The memory system 210 may be configured to provide an indication of the modes that are supported by the memory system 210. The host system 205 may set up the parameters of the write booster mode based on the modes that supported by the memory system 210. The host system 205 may indicate to the memory system 210 a size of the write booster buffer 215 (e.g., a quantity of logical units or blocks in the write booster buffer 215). The memory system 210 may configure the write booster buffer 215 based on the indicated size. In some cases, the indicator for the size of the write booster buffer 215 may be a flag stored in a registered shared between the host system 205 and the memory system 210. The host system 205 may transmit one or more indications or flags to the memory system 210 to operate using the write booster mode. In some cases, to transmit the indications, the host system 205 may change a value in a register and the memory system 210 may read the relevant registers to determine one or more operating parameters for the different operations. The host system 205 may set other values to enable the write booster mode as well (e.g., by transmitting one or more indications of the other values, by causing one or more of the values to be written to a location that can be referenced by the memory system 210).

For example, the host system 205 may enable the write booster mode by transmitting an activate command or by setting an activate flag (e.g., a write booster enable flag) to an activation value. The host system 205 may transmit a write command with information 225 (e.g., as part of a same transmission or in separate transmissions) to memory system 210. If the activate flag indicates that the write booster mode is not active (e.g., not enabled), the memory system 210 may write the information 225 to storage space 220 (e.g., in one or more TLC blocks). If the activate flag indicates that the write booster mode is active (e.g., enabled), the memory system 210 may write the information to the write booster buffer 215 (e.g., in one or more SLC blocks). Writes to the write booster buffer 215 may decrease the lifetime of the memory system 210 because the information is being written in SLC blocks rather than TLC blocks.

Upon receiving the information 225 (and the associated write command) and determining that the write booster mode is enabled, the memory system 210 may determine whether the write booster buffer 215 is full or empty. In such examples, the memory system 210 may determine whether the write booster buffer 215 includes any invalid blocks (or partially invalid blocks) available to store the information. If the write booster buffer 215 is full, the memory system 210 may store the information 225 in the storage space 220 using normal write procedures. If the write booster buffer 215 is not full (e.g., some space is available to store the information 225), the memory system 210 may store the information 225 to the write booster buffer 215 using the write booster mode procedures.

In some examples, the memory system 210 transmit information back to the host system, for example, by setting one or more values in a register. In some cases, the memory system 210 may set a flag in a register to indicate the available space in the write booster buffer 215. The memory system 210 may indicate to the host system 205 when an exception event is triggered, such as when the write booster buffer 215 is full (or the amount of valid information in the write booster buffer 215 satisfies a threshold) the information in the write booster buffer 215 is flushed (e.g., transferred) to the storage space 220. The memory system 210 may store a value in register to indicate that write booster buffer 215 is nearly full (e.g., has more occupied space than a given threshold). In some cases, the register indicates how full the write booster buffer 215 is and, in some cases, the register indicates that the amount of valid date in the write booster buffer 215 exceeds a threshold.

A flush operation 230 may be an operation where the memory system 210 moves information from the write booster buffer 215 (e.g., in SLC blocks) to the storage space 220 (e.g., in TLC blocks). The host system 205 may issue a flush command to initiate a flush operation 230 at the memory system 210. In some cases, there are two different types of flush operations for the write booster buffer: a write booster buffer flush enable command and a write booster buffer flush during hibernate command. In some examples, two flags in one or more registers may be used by the host system 205 and the memory system 210 for controlling what flush operation 230 for the write booster buffer is performed. For example, when a write booster buffer flush enable flag is set it may enable the memory system 210 to perform the flush operation 230 on the write booster buffer 215 when the memory system 210 is in an idle state (e.g., when the command buffer in the memory system 210 is empty). In another example, when a write booster buffer flush during hibernate flag is set it may enable the memory system 210 to perform the flush operation 230 on the write booster buffer 215 when the memory system 210 is in a hibernate state.

The duration to flush the write booster buffer 215 may depend on the amount of data to be flushed. The memory system 210 may perform the flush operation 230 when the command buffer (e.g., command queue) of the memory system 210 is empty (e.g., the memory system is in an idle state). In such cases, the memory system 210 may prioritize performing commands received from the host system 205 over performing the flush operation 230. If the memory system 210 receives a command from the host system 205 while flushing the write booster buffer 215, the memory system 210 may suspend the flush operation 230 to expedite the processing of that command. After completing the host command, the memory system 210 may resume flushing the data from the write booster buffer 215. While the flush operation 230 is in progress, the memory system 210 may be in active power mode. The memory system 210 may stop the flush operation 230 if the host system 205 sets both the write booster buffer flush enable flag and the write booster buffer flush during hibernate flag are set to a disabled value (e.g., zero).

As part of performing a write command in a write booster mode or a flush operation of the write booster buffer 215, the memory system 210 may be configured to send one or more notifications 235. The notifications 235 may be examples of flags or values that are set in one or more registers. In some examples, the memory system 210 may transmit a notification 235 to the host system 205 after the memory system 210 successfully write the information 225 (either using the write booster mode or a normal mode). Examples of such a notification may include an acknowledgement or a negative acknowledgement about whether the write command was successful. In some examples, memory system 210 may transmit a notification 235 to the host system 205 that indicates a status of the flush operation 230 for the write booster buffer 215. Examples of such a notification may include an indication that a flush operation 230 for the write booster buffer 215 is in progress, an indication that the flush operation 230 for the write booster buffer 215 ended before completion, or an indication that the flush operation 230 for the write booster buffer 215 is complete (e.g., the write booster buffer 215 is empty), or other options, or any combination thereof. In some cases, the notification 235 for the flush operation may indicate that a flush operation 230 is in progress even if the flush operation 230 has been temporarily suspended (e.g., when a flush operation has been started but is not yet completed and has been temporarily suspended).

A flush operation 230 where information is moved from the write booster buffer 215 to the storage space 220 takes time and computational resources of the memory system 210. For example, reading data from SLC blocks (e.g., the write booster buffer 215) and then writing the data into TLC blocks (e.g., the storage space 220) may take time. In some cases, such a flush operation 230 may be an example of a memory management operation or a garbage collection operation. While such operations are occurring, the memory system 210 may be unable to perform other operations, such as other memory management operations. Further, if the host system 205 transmits a command (e.g., the command buffer is no longer empty), the memory system 210 may interrupt the flush operation 230 to perform the command received from the host system 205. In such circumstances, the memory system 210 may not spend enough time in an idle state (e.g., when the command queue is empty) or in a hibernate state to completely empty the write booster buffer 215. Thus, the write booster buffer 215 may remain partially full and my impact the ability of the memory system 210 to perform writes using the write booster mode. For example, the memory system 210 may be unable to perform a write operation in the write booster mode if the write booster buffer 215 is full.

Techniques are described herein for performing a flush operation 230 for a write booster buffer 215 of the memory system 210. The flush operation 230 is configured to make space in the write booster buffer 215 without waiting for the information stored in the write booster buffer 215 to be transferred from SLC blocks of the write booster buffer 215 to the TLC blocks of the storage space 220. The flush operation 230 may include swapping valid blocks in the write booster buffer 215 for invalid blocks in the storage space 220 and transferring the information from the SLC blocks to the TLC blocks after the blocks have been swapped. In such a flush operation 230, space is made available in the write booster buffer 215 faster (e.g., with less latency) than it would take to transfer information between blocks, thereby improving the performance of the write booster mode. In some cases, transferring the information between blocks may be accomplished through memory management operations other than the flush operation because both the source blocks and the destination blocks involved with the transfer are in the storage space 220.

Figure 3A:
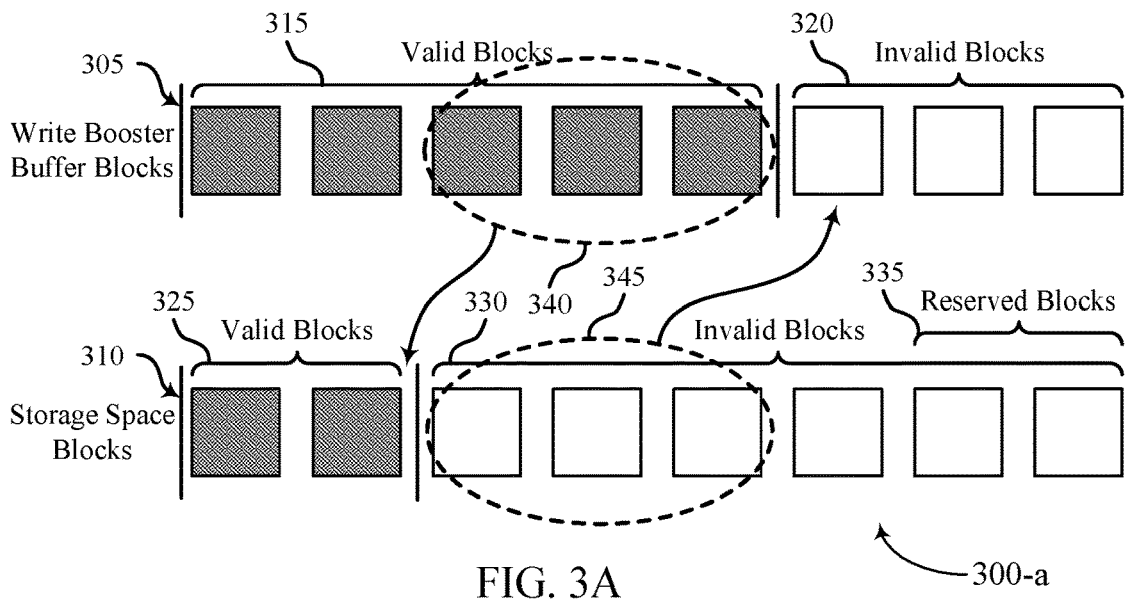
FIGS. 3A, 3B, and 3C illustrate examples of process diagrams that support write booster buffer flush operation in accordance with examples as disclosed herein.
Figure 3B:
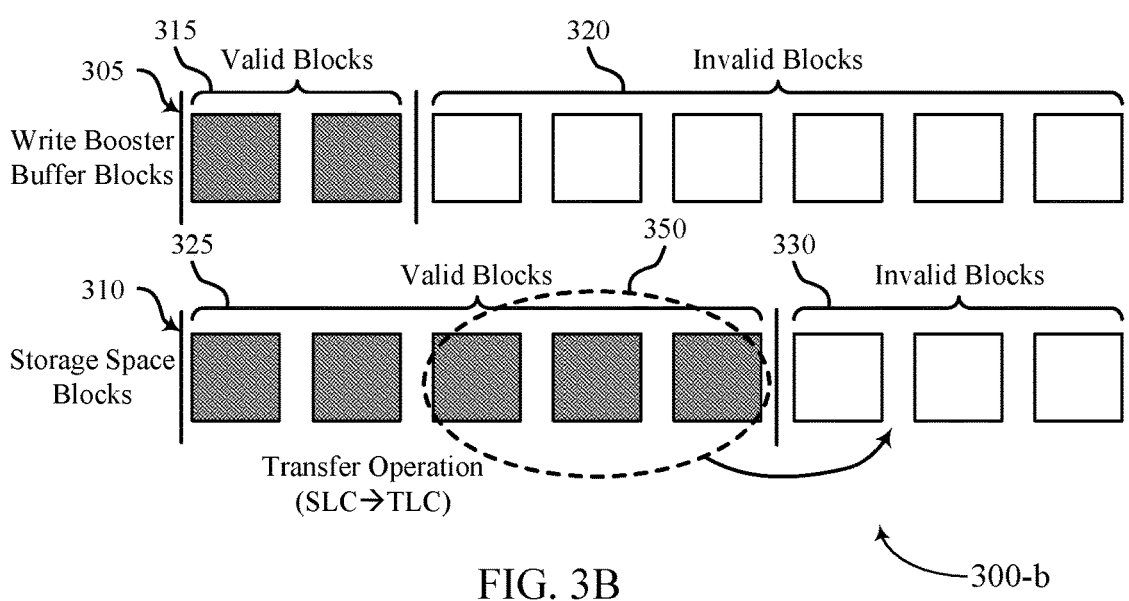
Figure 3C:
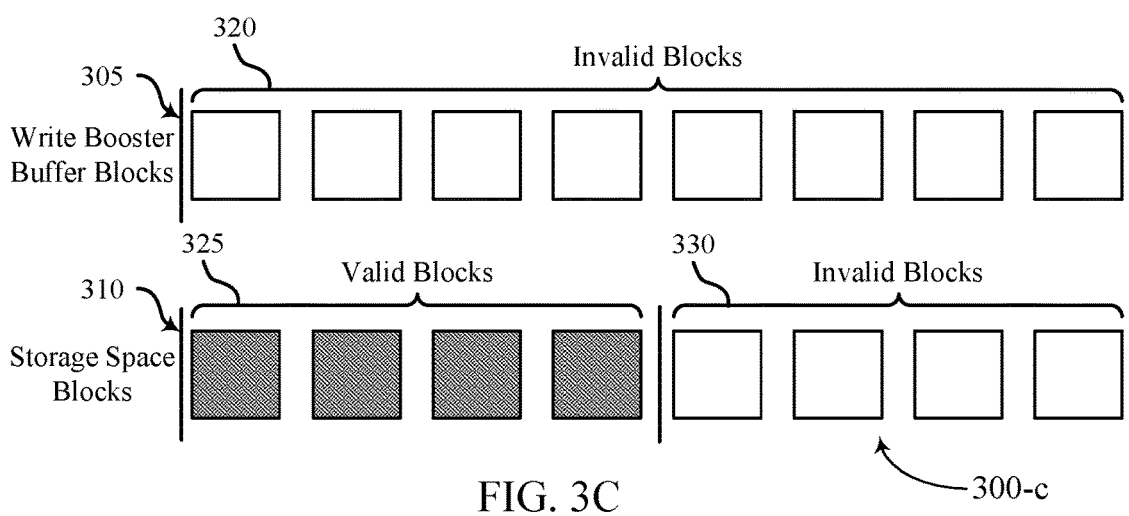

FIGS. 3A, 3B, and 3C illustrate examples of process diagrams 300-a, 300-b, and 300-c that supports write booster buffer flush operation in accordance with examples as disclosed herein. Each of the process diagrams 300-a, 300-b, and 300-c illustrate a possible configuration of blocks during a flush operation for a write booster buffer, which may be an example of the flush operation 230 described with reference to FIG. 2.

FIG. 3A illustrates an example of a process diagram 300-a that supports write booster buffer flush operation in accordance with examples as disclosed herein. Specifically, the process diagram 300-a illustrates one or more initial steps of a flush operation of a write booster buffer.

The process diagrams 300-a, 300-b, and 300-c illustrate a plurality of write booster buffer blocks 305 and a plurality of storage space blocks 310. A first quantity (or first set) of the write booster buffer blocks 305 may be examples of valid blocks 315 that store the information stored in the write booster buffer. A second quantity (or second set) of the write booster buffer blocks 305 may be examples of invalid blocks 320 (or partially invalid blocks) that are available to store information in the write booster buffer. A first quantity (or first set) of the storage space blocks 310 may be examples of valid blocks 325 that store the information stored in the storage space. A second quantity (or second set) of the storage space blocks 310 may be examples of invalid blocks 330 (or partially invalid blocks) that are available to store information in the storage space.

A flush operation of the write booster buffer may be initiated based on a command from the host system. In some cases, the memory system may indicate to the host system when the write booster buffer is full or when the write booster buffer exceeds a storage threshold. As described herein, the host system may issue one of two different types of flush operations for the write booster buffer: a write booster buffer flush enable command and a write booster buffer flush during hibernate command. For the write booster buffer flush enable command, the memory system may be configured to perform the flush operation when the command buffer is empty (e.g., when the memory system is in an idle state). For the write booster buffer flush during hibernate command, the memory system may be configured to perform the flush operation when the memory system is in a hibernate state. Once the memory system enters the idle state or the hibernate state, the memory system may check the registers to determine whether the host system has issued the write booster buffer flush enable command or the write booster buffer flush during hibernate command.

The flush operation of the write booster buffer may be configured to empty the write booster buffer or at least make more room in the write booster buffer for more information associated with write commands. For example, before the flush operation occurs, the write booster buffer may include a first quantity of the valid blocks 315, and a goal of the flush operation is to replace valid blocks 315 in the write booster buffer with invalid blocks 320 of the write booster buffer.

After initiating the flush operation of the write booster buffer, the memory system may determine whether a quantity of invalid blocks 330 in the storage space of the memory system is greater than a threshold. The memory system may be configured to initiate a garbage collection operation for the storage space (e.g., automatically initiate the garbage collection operation) if the quantity of invalid blocks 330 falls below a threshold. The reserved blocks 335 of the storage space blocks 310 may represent a quantity of invalid blocks that are reserved to perform garbage collection operations. If the quantity of invalid blocks in the storage space are equal to or are below the quantity of reserved blocks 335, the memory system may, for example, automatically initiate a garbage collection operation. It may be desirable if the flush operation of the write booster buffer avoids automatically triggering a garbage collection operation in the storage space. In some cases, the quantity of invalid blocks 330 in the storage space that may be available for a flush operation may be equal to the quantity of invalid blocks 330 minus the quantity of the reserved blocks. In some cases, the quantity of invalid blocks 330 in the storage space that may be available for a flush operation may be equal to the quantity of invalid blocks 330 minus the quantity of the reserved blocks and minus a safety factor (e.g., zero, one, two, three, or four invalid blocks); thereby decreasing the likelihood that the garbage collection operation is triggered for the storage space. In some cases, the threshold that is compared with the quantity of invalid blocks 330 of the storage space may be equal to the quantity of the reserved blocks 335 or the quantity of the reserved blocks 335 plus the safety factor.

If the quantity of invalid blocks 330 available in the storage space for use by the flush operation exceeds the quantity of valid blocks 315 in the write booster buffer, one or more components of the memory system, as part of the flush operation, may swap the valid blocks 315 in the write booster buffer for an equal quantity of invalid blocks 330 in the storage space. After the blocks are swapped (e.g., reassigned), the memory system may transfer the information from the SLC blocks formerly associated with the write booster buffer (and now in the storage space) to TLC blocks in the storage space, which is described in more detail with reference to FIG. 3B.

In some cases, the quantity of invalid blocks 330 available to use as part of the flush operation may be less than quantity of valid blocks 315 in the write booster buffer. In such situations, an iterative process may be used by the flush operation to empty the write booster buffer. In some cases, the memory system may select the smallest value (e.g., a MIN operation) of the quantity of the valid blocks 315 in the write booster buffer and the quantity of the invalid blocks 330 available to use as part of the flush operation. The memory system may determine the quantity of the invalid blocks 330 in the storage space available for use by the flush operation by taking the total quantity of invalid blocks 330 in the storage space minus the quantity of the reserved blocks 335 and minus a safety factor (e.g., zero, one, two, three, or four invalid blocks). If the memory system selects the quantity of blocks to swap that is less than the total quantity of valid blocks 315 in the write booster buffer, the flush operation may use an iterative process to empty the write booster buffer where some steps may be repeated.

In some cases, the memory system may select a quantity of blocks to swap between the write booster buffer and the storage space as part of the flush operation. For example, a first set of blocks 340 may be an example of three valid blocks of the write booster buffer that the memory system may select to swap with a second set of blocks 345 that is an example of three invalid blocks in the storage space. As used herein, a set may include any quantity of units (e.g., zero, one, two, three, four, five, six, seven, eight, etc.). To swap the first set of blocks 340 with the second set of blocks 345, the memory system may reassign the blocks of the first set of blocks 340 to be part of storage space and reassign the blocks of the second set of blocks 345 to be part of the write booster buffer. When reassigning the blocks, the information stored in the blocks may not be moved. Rather, the second set of blocks 345 represent blocks that are newly available for use in the write booster buffer. Swapping the first set of blocks 340 with the second set of blocks 345 may immediately create additional space in the write booster buffer. In such cases, the information that was written in the write booster buffer is still stored in SLC blocks, but those SLC blocks are now assigned as part of the storage space. Such techniques may reduce the duration it takes to free up space in the write booster buffer. Thus, when the memory system enters an idle state or a hibernate state, the memory system may be configured to more quickly make space available in the write booster buffer, thereby improving the performance of the write booster mode. Later, the transferring of information from SLC blocks to TLC blocks can be accomplished without as many adverse impacts on the performance of the write booster mode and the write booster buffer.

FIG. 3B illustrates an example of a process diagram 300-b that supports write booster buffer flush operation in accordance with examples as disclosed herein. Specifically, the process diagram 300-b illustrates one or more intermediate steps of a flush operation of a write booster buffer.

The process diagram 300-b illustrates a process for transferring information from a third set of blocks 350 that were formerly part of the write booster buffer (e.g., SLC blocks) to blocks associated with the storage space (e.g., TLC blocks). The third set of blocks 350 may be examples of the first set of blocks 340, but now those blocks are assigned to the storage space. In some cases, swapping the first set of blocks 340 with the second set of blocks 345 may leave the storage space with too few invalid blocks 330 to do another iteration of the flush operation. The memory system may make more space available in the storage space by transferring the information from the write booster buffer from a first type of storage (e.g., SLC blocks) to a denser type of storage (e.g., TLC blocks). The memory system may perform one or more memory management operations (e.g., garbage collection operations) on the blocks in the storage space to make more space available for additional iterations of the flush operation (e.g., if the flush operation is not complete).

Once the information in third set of blocks 350 has been transferred to different blocks in the storage space, the memory system may have more invalid blocks 330 available to use for additional iterations of the flush operation. The memory system may determine whether the write booster buffer includes one or more valid blocks 315 that store portions of the information after reassigning the first set of blocks 340 to the storage space. The memory system may then additionally perform (e.g., repeat) portions of the techniques described herein, such as determining whether the quantity of the invalid blocks 330 in the storage space satisfy a threshold and determining a quantity of blocks to swap between the write booster buffer and the storage space. The memory system may then do the reassigning (e.g., swapping) of the sets of blocks and transferring the information from the first type of storage (e.g., SLC blocks) to a denser type of storage (e.g., TLC blocks). The memory system may iteratively perform the techniques of the flush operation until the write booster buffer is empty or until the amount of free space in the write booster buffer is above a threshold.

FIG. 3C illustrates an example of a process diagram 300-c that supports write booster buffer flush operation in accordance with examples as disclosed herein. Specifically, the process diagram 300-c illustrates a status, such as a final status, of a flush operation of a write booster buffer that is successful. For example, the write booster buffer blocks 305 include invalid blocks 320, but does not include valid blocks 315. Once the memory system determines that the write booster buffer is empty, for example, the memory system send a notification to the host system that the flush operation is complete. The memory system may interrupt the flush operation at any stage of the flush operation. Given the reduced time to swap blocks between the write booster buffer and the storage space, such interrupts may not have as many or the same adverse impacts on the performance of the write booster mode compared to other different techniques because swapping the blocks takes relatively less time than transferring information between blocks.

Figure 4:
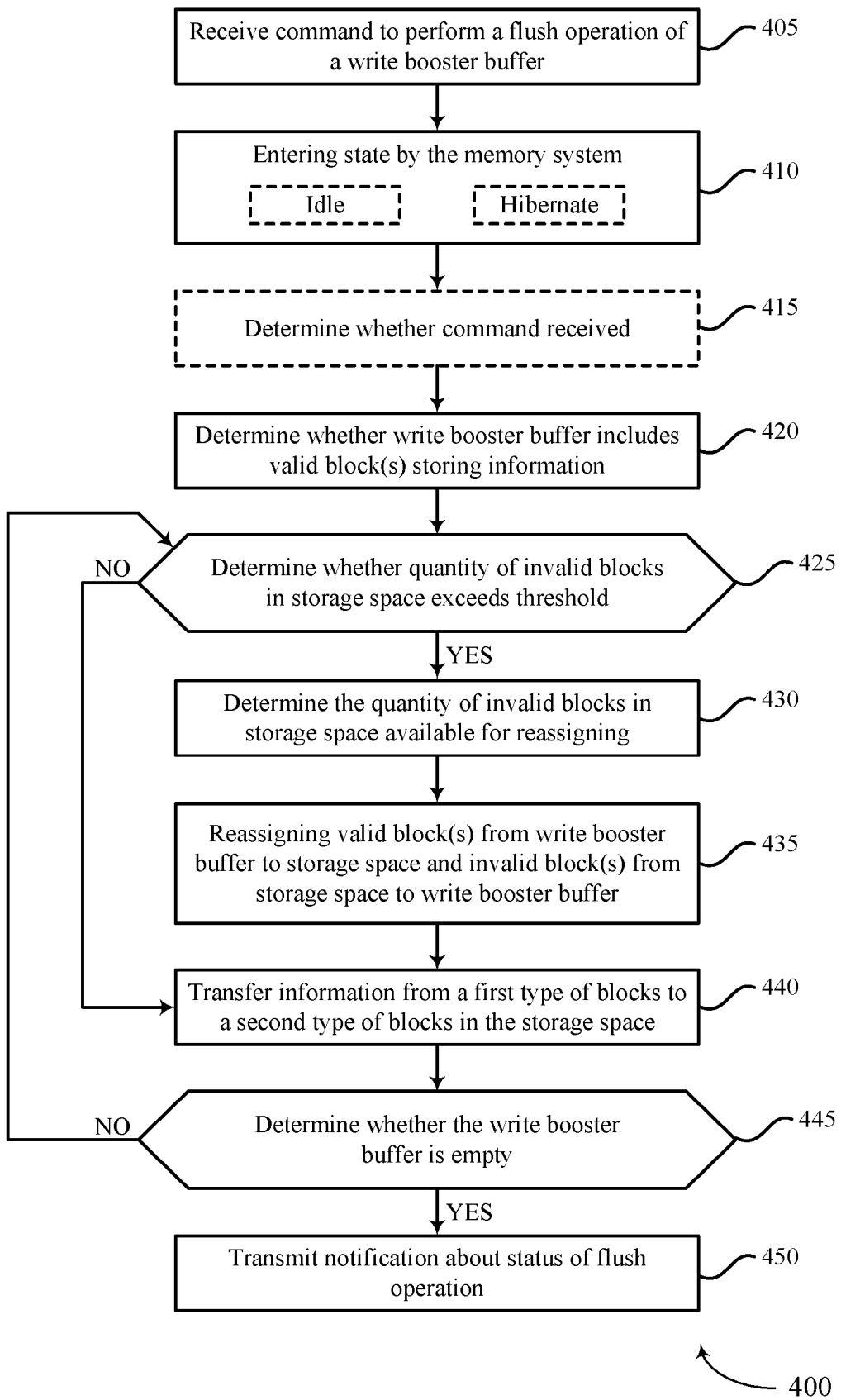
FIG. 4 shows a flowchart illustrating a method or methods that supports write booster buffer flush operation in accordance with examples as disclosed herein.

FIG. 4 shows a flowchart 400 illustrating a method or methods that supports write booster buffer flush operation in accordance with examples as disclosed herein. The flowchart 400 may be performed by components of a memory system, such as a memory system 110 or the memory system 210 described with reference to FIGS. 1-3C. For example, the flowchart 400 may be performed by a controller of a memory system or a memory device (or both) such as a memory system controller 115 or a local controller 135 as described with reference to FIG. 1. The flowchart 400 may be implemented to reduce latency of a write booster mode and power consumption and increase system performance, among other benefits. Additionally or alternatively, aspects of the flowchart 400 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the flowchart 400. In the following description of the flowchart 400, the operations may be performed in different orders or at different times. Some operations may also be omitted from the flowchart 400, and other operations may be added to the flowchart 400.

At 405, a command may be received to perform a flush operation of a write booster. In some examples, a host system may send such a command to a memory system using one or more registers storing one or more flags. In some examples, the memory system may receive a write booster buffer flush enable command for the memory system to perform the flush operation on the write booster buffer during an idle state of the memory system or a write booster buffer flush during a hibernate state (e.g., based on a hibernate command) for the memory system to perform the flush operation on the write booster buffer during a hibernate state of the memory system.

At 410, a state of operation may be entered by the memory system. For example, if the command buffer is empty of commands, the memory system may enter an idle state. In another example, the memory system may enter a hibernate state.

At 415, upon entering the state, the memory system may determine whether the host system has sent the write booster buffer flush enable command or the write booster buffer flush during hibernate command. If the memory system enters the idle state and the write booster buffer flush enable command has been received, the memory system may initiate the flush operation. If the memory system enters the hibernate state and the write booster buffer flush during hibernate command has been received, the memory system may initiate the flush operation. In some examples, if the memory system enters the idle state and the write booster buffer flush during hibernate command has been received, but the write booster buffer flush enable command has not been received, the memory system may not initiate the flush operation.

At 420, it may be determined whether write booster buffer includes one or more valid blocks storing information. In some cases, the memory system may initiate the flush operation based on the valid information in the write booster buffer exceeding a threshold. In some cases, the memory system may determine a quantity of valid blocks (or an amount of valid information) in the write booster buffer. Additional details about these determinations are described with reference to FIGS. 2-3C.

At 425, it may be determined whether a quantity of invalid blocks in the storage space exceeds a threshold. If a sufficient quantity of invalid blocks are in the storage space, the techniques of the flush operation may be performed. In some cases, when the quantity of invalid blocks does not exceed the threshold, the flush operation may include transferring information from the blocks in the write booster buffer (e.g., SLC blocks) to the blocks in the storage space (e.g., TLC blocks) without swapping blocks between the write booster buffer and the storage space. In some cases, when the quantity of invalid blocks does not exceed the threshold, the memory system may trigger a garbage collection operation in the storage space to make more space available. In such cases, the memory system may suspend the flush operation temporarily until additional space is free in the storage space. If the quantity of invalid blocks in the storage space exceeds the threshold, the memory system may perform the functions associated with 430-450. If the quantity of invalid blocks in the storage space does not exceed the threshold, the memory system may perform the functions associated with 440-450. Additional details about these determinations are described with reference to FIG. 3A.

At 430, a quantity of invalid blocks in the storage space that are available for the flush operation of the write booster buffer are determined. The quantity of invalid blocks in the storage space that are available for the flush operation may be determined based on a total quantity of invalid blocks in the storage space minus a quantity of reserved blocks in the storage space and minus a safety factor. Additional details about these determinations are described with reference to FIG. 3A.

At 435, one or more valid blocks in the write booster buffer may be reassigned to the storage space and one or more invalid blocks in the storage space may be reassigned to the write booster buffer. Such techniques may make space available in the write booster buffer faster than transferring information directly from blocks in the write booster buffer to the storage space. Additional details about the reassigning operations are described with reference to FIG. 3A.

At 440, information from a first type of blocks (e.g., SLC blocks associated with the write booster buffer) may be transferred to a second type of blocks (e.g., TLC blocks) in the storage space. Such a transfer may move data from a less dense storage environment (e.g., SLC blocks) to a denser storage environment (e.g., TLC blocks). Performing the transferring after swapping blocks between the write booster buffer and the storage space may reduce a duration it takes to make space available in the write booster buffer by de-coupling the duration it takes to make space available in the write booster buffer from the duration it takes to transfer data between different blocks. Additional details about the transferring operations are described with reference to FIG. 3B.

At 445, it may be determined whether the write booster buffer is empty. If the memory system determines that that the write booster buffer is not empty, the memory system may iteratively perform the functions of 425-440 until the write booster buffer is empty. If the memory system determines that the write booster buffer is empty, the memory system may perform the functions at 450. Additional details about these determinations are described with reference to FIG. 3B.

At 450, a notification may be transmitted to the host system about the status of the flush operation. Examples of such a notification may include an indication that a flush operation for the write booster buffer is in progress, an indication that the flush operation for the write booster buffer ended before completion, or an indication that the flush operation for the write booster buffer is complete (e.g., the write booster buffer is empty). In some cases, the notification for the flush operation may indicate that a flush operation is in progress even if the flush operation has been temporarily suspended. Additional details about the notifications are described with reference to FIGS. 2-3C.

Figure 5:
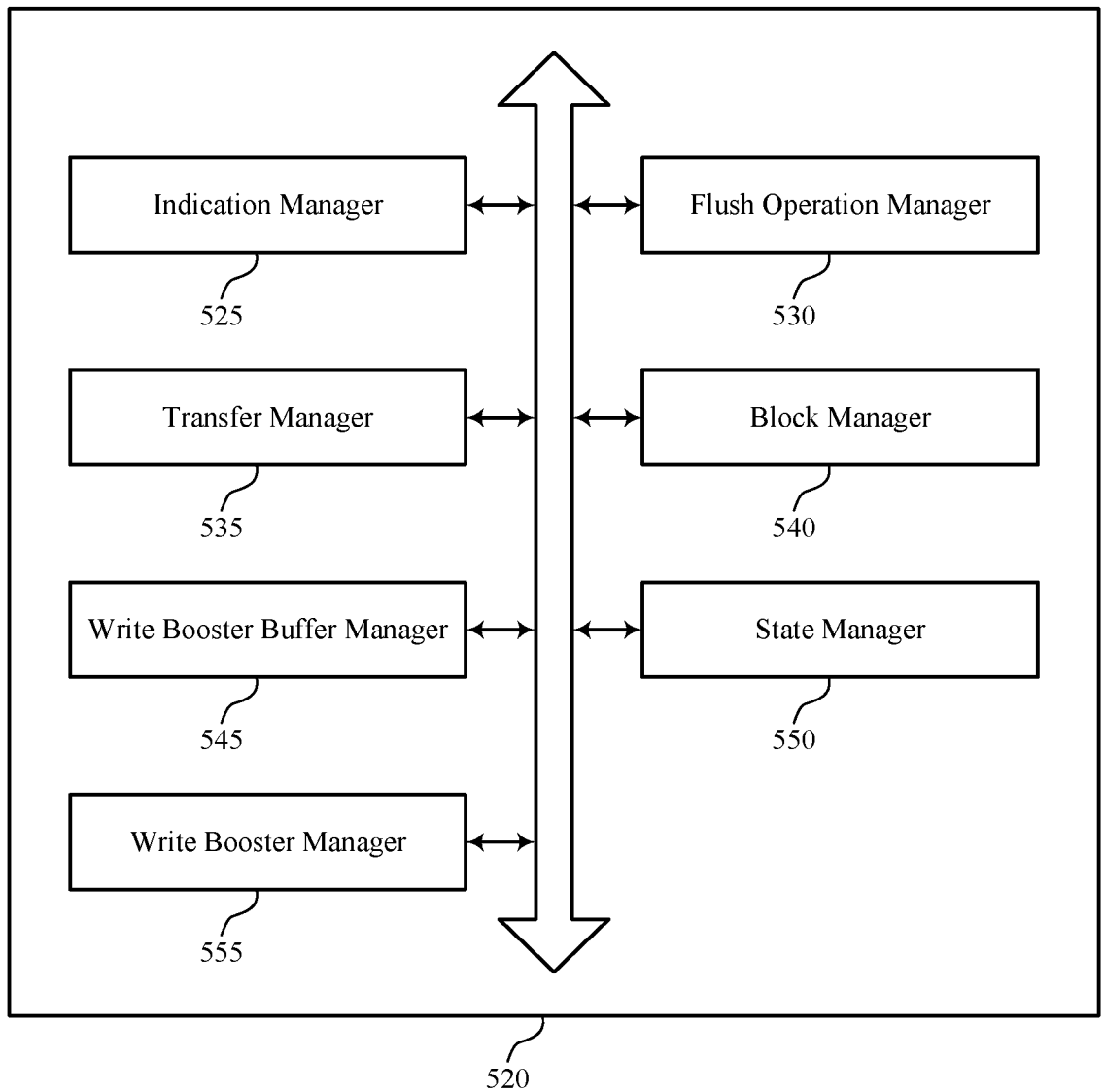
FIG. 5 shows a block diagram of a memory system that supports write booster buffer flush operation in accordance with examples as disclosed herein.

FIG. 5 shows a block diagram 500 of a memory system 520 that supports write booster buffer flush operation in accordance with examples as disclosed herein. The memory system 520 may be an example of aspects of a memory system as described with reference to FIGS. 1 through 4. The memory system 520, or various components thereof, may be an example of means for performing various aspects of write booster buffer flush operation as described herein. For example, the memory system 520 may include an indication manager 525, a flush operation manager 530, a transfer manager 535, a block manager 540, a write booster buffer manager 545, a state manager 550, a write booster manager 555, or any combination thereof. Each of these components may communicate, directly or indirectly, with one another (e.g., via one or more buses).

The indication manager 525 may be configured as or otherwise support a means for receiving a command to transfer information from a write booster buffer to a storage space of a memory device, the write booster buffer including a first plurality of blocks and the storage space including a second plurality of blocks. The flush operation manager 530 may be configured as or otherwise support a means for reassigning, based at least in part on receiving the command, a valid block of the write booster buffer to the storage space and an invalid block of the storage space to the write booster buffer, the valid block storing a portion of the information stored in the write booster buffer and the invalid block available to store information. The transfer manager 535 may be configured as or otherwise support a means for transferring the portion of the information stored in the valid block to a block of multiple level memory cells of the storage space after reassigning the valid block to the storage space and reassigning the invalid block to the write boost buffer.

In some examples, the block manager 540 may be configured as or otherwise support a means for determining whether a first quantity of invalid blocks of the storage space satisfies a threshold quantity of invalid blocks of the storage space, where reassigning the valid block and the invalid block is based at least in part on determining that the first quantity of invalid blocks satisfies the threshold quantity of invalid blocks.

In some examples, the block manager 540 may be configured as or otherwise support a means for determining a second quantity of invalid blocks of the storage space that exceeds the threshold quantity of invalid blocks, where reassigning the valid block includes reassigning the second quantity of the valid blocks of the write booster buffer and reassigning the invalid block includes reassigning the second quantity of the invalid blocks of the storage space.

In some examples, the threshold quantity of invalid blocks of the storage space is associated with a quantity of invalid blocks used to trigger a garbage collection operation.

In some examples, the write booster buffer manager 545 may be configured as or otherwise support a means for determining whether the write booster buffer includes one or more valid blocks that store portions of the information after reassigning the valid block to the storage space. In some examples, the flush operation manager 530 may be configured as or otherwise support a means for reassigning, based at least in part on determining that the write booster buffer includes the one or more valid blocks, a second set of valid blocks from the write booster buffer to the storage space and a second set of invalid blocks from the storage space to the write booster buffer.

In some examples, the state manager 550 may be configured as or otherwise support a means for entering, by the memory device, a state associated with performing a flush operation associated with the command to transfer the information from the write booster buffer to the storage space based at least in part on receiving the command, where reassigning the valid block and the invalid block is based at least in part on entering the state.

In some examples, the command includes a write booster buffer flush during hibernate flag. In some examples, the state includes a hibernate state of the memory device.

In some examples, the command includes a write booster buffer flush enable flag. In some examples, the state includes an idle state of the memory device.

In some examples, the state manager 550 may be configured as or otherwise support a means for determining whether a command buffer associated with commands received from a host system and waiting to be executed by the memory device is empty, where reassigning the valid block and the invalid block is based at least in part on determining that the command buffer is empty.

In some examples, the indication manager 525 may be configured as or otherwise support a means for transmitting, to a host system, a notification of a status of a flush operation for the write booster buffer based at least in part on reassigning the valid block and the invalid block, where the notification includes an indication that a flush operation associated with the command is in progress, an indication that the flush operation ended before completion, or an indication that the flush operation is complete.

In some examples, the write booster buffer manager 545 may be configured as or otherwise support a means for determining whether the write booster buffer is empty of the information, where transmitting the notification is based at least in part on determining that the write booster buffer is empty.

In some examples, the write booster buffer includes a first plurality of SLC blocks. In some examples, the storage space including a second plurality of TLC blocks.

In some examples, the write booster manager 555 may be configured as or otherwise support a means for receiving an activate command to write information to the write booster buffer. In some examples, the write booster manager 555 may be configured as or otherwise support a means for receiving a write command to store information in the memory device. In some examples, the write booster manager 555 may be configured as or otherwise support a means for writing the information associated with the write command to an invalid block of the write booster buffer based at least in part on receiving the activate command and receiving the write command, where receiving the command is based at least in part on writing the information.

In some examples, the write booster manager 555 may be configured as or otherwise support a means for determining whether the write booster buffer includes one or more invalid blocks available to store information, where writing the information to the write booster buffer is based at least in part on determining that the write booster buffer includes the one or more invalid blocks.

Figure 6:
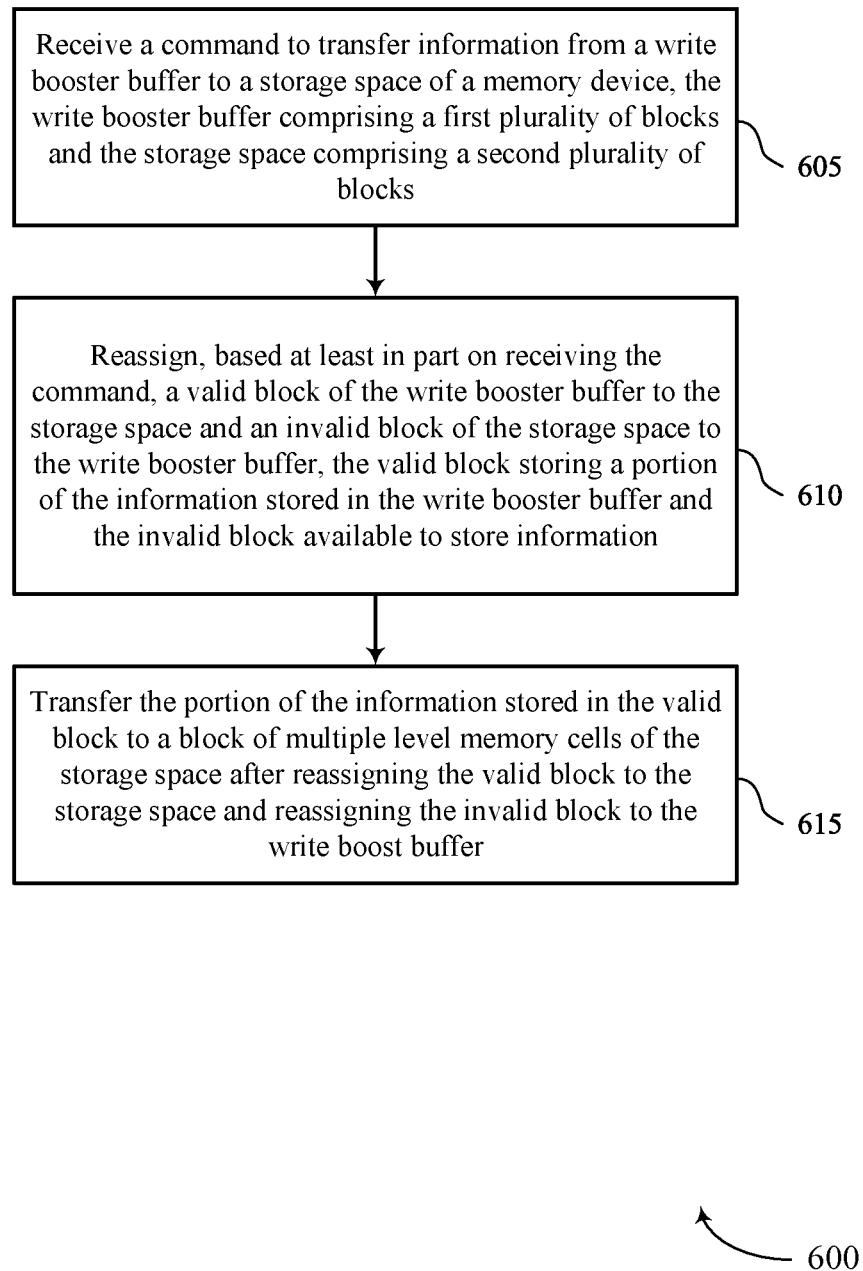
FIG. 6 shows a flowchart illustrating a method or methods that support write booster buffer flush operation in accordance with examples as disclosed herein.

FIG. 6 shows a flowchart illustrating a method 600 that supports write booster buffer flush operation in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include receiving a command to transfer information from a write booster buffer to a storage space of a memory device, the write booster buffer including a first plurality of blocks and the storage space including a second plurality of blocks. The operations of 605 may be performed in accordance with examples as disclosed herein. In some examples, aspects of the operations of 605 may be performed by an indication manager 525 as described with reference to FIG. 5.

At 610, the method may include reassigning, based at least in part on receiving the command, a valid block of the write booster buffer to the storage space and an invalid block of the storage space to the write booster buffer, the valid block storing a portion of the information stored in the write booster buffer and the invalid block available to store information. The operations of 610 may be performed in accordance with examples as disclosed herein. In some examples, aspects of the operations of 610 may be performed by a flush operation manager 530 as described with reference to FIG. 5.

At 615, the method may include transferring the portion of the information stored in the valid block to a block of multiple level memory cells of the storage space after reassigning the valid block to the storage space and reassigning the invalid block to the write boost buffer. The operations of 615 may be performed in accordance with examples as disclosed herein. In some examples, aspects of the operations of 615 may be performed by a transfer manager 535 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving a command to transfer information from a write booster buffer to a storage space of a memory device, the write booster buffer including a first plurality of blocks and the storage space including a second plurality of blocks, reassigning, based at least in part on receiving the command, a valid block of the write booster buffer to the storage space and an invalid block of the storage space to the write booster buffer, the valid block storing a portion of the information stored in the write booster buffer and the invalid block available to store information, and transferring the portion of the information stored in the valid block to a block of multiple level memory cells of the storage space after reassigning the valid block to the storage space and reassigning the invalid block to the write boost buffer.

Some examples of the method 600 and the apparatus described herein may further include operations, features, circuitry, logic, means, or instructions for determining whether a first quantity of invalid blocks of the storage space satisfies a threshold quantity of invalid blocks of the storage space, where reassigning the valid block and the invalid block may be based at least in part on determining that the first quantity of invalid blocks satisfies the threshold quantity of invalid blocks.

Some examples of the method 600 and the apparatus described herein may further include operations, features, circuitry, logic, means, or instructions for determining a second quantity of invalid blocks of the storage space that exceeds the threshold quantity of invalid blocks, where reassigning the valid block includes reassigning the second quantity of the valid blocks of the write booster buffer and reassigning the invalid block includes reassigning the second quantity of the invalid blocks of the storage space.

In some examples of the method 600 and the apparatus described herein, the threshold quantity of invalid blocks of the storage space may be associated with a quantity of invalid blocks used to trigger a garbage collection operation.

Some examples of the method 600 and the apparatus described herein may further include operations, features, circuitry, logic, means, or instructions for determining whether the write booster buffer includes one or more valid blocks that store portions of the information after reassigning the valid block to the storage space and reassigning, based at least in part on determining that the write booster buffer includes the one or more valid blocks, a second set of valid blocks from the write booster buffer to the storage space and a second set of invalid blocks from the storage space to the write booster buffer.

Some examples of the method 600 and the apparatus described herein may further include operations, features, circuitry, logic, means, or instructions for entering, by the memory device, a state associated with performing a flush operation associated with the command to transfer the information from the write booster buffer to the storage space based at least in part on receiving the command, where reassigning the valid block and the invalid block may be based at least in part on entering the state.

In some examples of the method 600 and the apparatus described herein, the command includes a write booster buffer flush during hibernate flag and the state includes a hibernate state of the memory device.

In some examples of the method 600 and the apparatus described herein, the command includes a write booster buffer flush enable flag and the state includes an idle state of the memory device.

Some examples of the method 600 and the apparatus described herein may further include operations, features, circuitry, logic, means, or instructions for determining whether a command buffer associated with commands received from a host system and waiting to be executed by the memory device may be empty, where reassigning the valid block and the invalid block may be based at least in part on determining that the command buffer may be empty.

Some examples of the method 600 and the apparatus described herein may further include operations, features, circuitry, logic, means, or instructions for transmitting, to a host system, a notification of a status of a flush operation for the write booster buffer based at least in part on reassigning the valid block and the invalid block, where the notification includes an indication that a flush operation associated with the command may be in progress, an indication that the flush operation ended before completion, or an indication that the flush operation may be complete.

Some examples of the method 600 and the apparatus described herein may further include operations, features, circuitry, logic, means, or instructions for determining whether the write booster buffer may be empty of the information, where transmitting the notification may be based at least in part on determining that the write booster buffer may be empty.

In some examples of the method 600 and the apparatus described herein, the write booster buffer includes a first plurality of SLC blocks and the storage space including a second plurality of TLC blocks.

Some examples of the method 600 and the apparatus described herein may further include operations, features, circuitry, logic, means, or instructions for receiving an activate command to write information to the write booster buffer, receiving a write command to store information in the memory device, and writing the information associated with the write command to an invalid block of the write booster buffer based at least in part on receiving the activate command and receiving the write command, where receiving the command may be based at least in part on writing the information.

Some examples of the method 600 and the apparatus described herein may further include operations, features, circuitry, logic, means, or instructions for determining whether the write booster buffer includes one or more invalid blocks available to store information, where writing the information to the write booster buffer may be based at least in part on determining that the write booster buffer includes the one or more invalid blocks.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
one or more controllers coupled with the one or more memory devices and configured to cause the memory system to:
receive a command to transfer information from a write booster buffer to a storage space of the one or more memory devices, the write booster buffer comprising a first plurality of blocks and the storage space comprising a second plurality of blocks;
reassign, based at least in part on receiving the command, a valid block of the write booster buffer to the storage space and an invalid block of the storage space to the write booster buffer, the valid block storing a portion of the information stored in the write booster buffer and the invalid block available to store information, wherein the reassigning is based at least in part on a quantity of invalid blocks of the storage space satisfying a threshold quantity of invalid blocks, the threshold quantity being associated with a quantity of blocks of the quantity of invalid blocks triggering a garbage collection operation on the storage space; and
transfer the portion of the information stored in the valid block to a block of multiple level memory cells of the storage space after reassigning the valid block to the storage space and reassigning the invalid block to the write booster buffer.

2. The memory system of claim 1, wherein the one or more controllers are further configured to cause the memory system to:
determine whether a first quantity of invalid blocks of the storage space satisfies the threshold quantity of invalid blocks of the storage space, wherein reassigning the valid block and the invalid block is based at least in part on determining that the first quantity of invalid blocks satisfies the threshold quantity of invalid blocks.

3. The memory system of claim 2, wherein the one or more controllers are further configured to cause the memory system to:
determine a second quantity of invalid blocks of the storage space that exceeds the threshold quantity of invalid blocks, wherein reassigning the valid block comprises reassigning a second quantity of valid blocks of the write booster buffer and reassigning the invalid block comprises reassigning the second quantity of the invalid blocks of the storage space.

4. The memory system of claim 2, wherein the threshold quantity of invalid blocks of the storage space is associated with a quantity of invalid blocks used to trigger a garbage collection operation.

5. The memory system of claim 1, wherein the one or more controllers are further configured to cause the memory system to:
determine whether the write booster buffer includes one or more valid blocks that store portions of the information after reassigning the valid block to the storage space; and
reassign, based at least in part on determining that the write booster buffer includes the one or more valid blocks, a second set of valid blocks from the write booster buffer to the storage space and a second set of invalid blocks from the storage space to the write booster buffer.

6. The memory system of claim 1, wherein the one or more controllers are further configured to cause the memory system to:
enter, by the one or more memory devices, a state associated with performing a flush operation associated with the command to transfer the information from the write booster buffer to the storage space based at least in part on receiving the command, wherein reassigning the valid block and the invalid block is based at least in part on entering the state.

7. The memory system of claim 6, wherein:
the command comprises a write booster buffer flush during hibernate flag; and
the state comprises a hibernate state of the one or more memory devices.

8. The memory system of claim 6, wherein:
the command comprises a write booster buffer flush enable flag; and
the state comprises an idle state of the one or more memory devices.

9. The memory system of claim 1, wherein the one or more controllers are further configured to cause the memory system to:
determine whether a command buffer associated with commands received from a host system and waiting to be executed by the one or more memory devices is empty, wherein reassigning the valid block and the invalid block is based at least in part on determining that the command buffer is empty.

10. The memory system of claim 1, wherein the one or more controllers are further configured to cause the memory system to:
transmit, to a host system, a notification of a status of a flush operation for the write booster buffer based at least in part on reassigning the valid block and the invalid block, wherein the notification comprises an indication that a flush operation associated with the command is in progress, an indication that the flush operation ended before completion, or an indication that the flush operation is complete.

11. The memory system of claim 10, wherein the one or more controllers are further configured to cause the memory system to:
determine whether the write booster buffer is empty of the information, wherein transmitting the notification is based at least in part on determining that the write booster buffer is empty.

12. The memory system of claim 1, wherein:
the write booster buffer comprises a first plurality of single-level cell (SLC) blocks; and
the storage space comprising a second plurality of triple-level cell (TLC) blocks.

13. The memory system of claim 1, wherein the one or more controllers are further configured to cause the memory system to:
receive an activate command to write information to the write booster buffer;
receive a write command to store information in the one or more memory devices; and
write the information associated with the write command to an invalid block of the write booster buffer based at least in part on receiving the activate command and receiving the write command, wherein receiving the command is based at least in part on writing the information.

14. The memory system of claim 13, wherein the one or more controllers are further configured to cause the memory system to:
  determine whether the write booster buffer includes one or more invalid blocks available to store information, wherein writing the information to the write booster buffer is based at least in part on determining that the write booster buffer includes the one or more invalid blocks.

15. A non-transitory computer-readable medium storing code comprising instructions which, when executed by one or more processors of an electronic device, cause the electronic device to:
  receive a command to transfer information from a write booster buffer to a storage space of a memory device, the write booster buffer comprising a first plurality of blocks and the storage space comprising a second plurality of blocks;
  reassign, based at least in part on receiving the command, a valid block of the write booster buffer to the storage space and an invalid block of the storage space to the write booster buffer, the valid block storing a portion of the information stored in the write booster buffer and the invalid block available to store information, wherein the reassigning is based at least in part on a quantity of invalid blocks of the storage space satisfying a threshold quantity of invalid blocks, the threshold quantity being associated with a quantity of blocks of the quantity of invalid blocks triggering a garbage collection operation on the storage space; and
  transfer the portion of the information stored in the valid block to a block of multiple level memory cells of the storage space after reassigning the valid block to the storage space and reassigning the invalid block to the write booster buffer.

16. The non-transitory computer-readable medium of claim 15, wherein the instructions, when executed by the one or more processors of the electronic device, further cause the electronic device to:
  determine whether a first quantity of invalid blocks of the storage space satisfies the threshold quantity of invalid blocks of the storage space, wherein reassigning the valid block and the invalid block is based at least in part on determining that the first quantity of invalid blocks satisfies the threshold quantity of invalid blocks.

17. The non-transitory computer-readable medium of claim 16, wherein the instructions, when executed by the one or more processors of the electronic device, further cause the electronic device to:
  determine a second quantity of invalid blocks of the storage space that exceeds the threshold quantity of invalid blocks, wherein reassigning the valid block comprises reassigning a second quantity of valid blocks of the write booster buffer and reassigning the invalid block comprises reassigning the second quantity of the invalid blocks of the storage space.

18. The non-transitory computer-readable medium of claim 15, wherein the instructions, when executed by the one or more processors of the electronic device, further cause the electronic device to:
  determine whether the write booster buffer includes one or more valid blocks that store portions of the information after reassigning the valid block to the storage space; and
  reassign, based at least in part on determining that the write booster buffer includes the one or more valid blocks, a second set of valid blocks from the write booster buffer to the storage space and a second set of invalid blocks from the storage space to the write booster buffer.

19. The non-transitory computer-readable medium of claim 15, wherein the instructions, when executed by the one or more processors of the electronic device, further cause the electronic device to:
  enter, by the memory device, a state associated with performing a flush operation associated with the command to transfer the information from the write booster buffer to the storage space based at least in part on receiving the command, wherein reassigning the valid block and the invalid block is based at least in part on entering the state.

20. The non-transitory computer-readable medium of claim 15, wherein the instructions, when executed by the one or more processors of the electronic device, further cause the electronic device to:
  transmit, to a host system, a notification of a status of a flush operation for the write booster buffer based at least in part on reassigning the valid block and the invalid block, wherein the notification comprises an indication that a flush operation associated with the command is in progress, an indication that the flush operation ended before completion, or an indication that the flush operation is complete.

21. A method performed by a memory system, comprising:
  receiving a command to transfer information from a write booster buffer to a storage space of a memory device, the write booster buffer comprising a first plurality of blocks and the storage space comprising a second plurality of blocks;
  reassigning, based at least in part on receiving the command, a valid block of the write booster buffer to the storage space and an invalid block of the storage space to the write booster buffer, the valid block storing a portion of the information stored in the write booster buffer and the invalid block available to store information, wherein the reassigning is based at least in part on a quantity of invalid blocks of the storage space satisfying a threshold quantity of invalid blocks, the threshold quantity being associated with a quantity of blocks of the quantity of invalid blocks triggering a garbage collection operation on the storage space; and
  transferring the portion of the information stored in the valid block to a block of multiple level memory cells of the storage space after reassigning the valid block to the storage space and reassigning the invalid block to the write booster buffer.

22. The method of claim 21, further comprising:
  determining whether a first quantity of invalid blocks of the storage space satisfies the threshold quantity of invalid blocks of the storage space, wherein reassigning the valid block and the invalid block is based at least in part on determining that the first quantity of invalid blocks satisfies the threshold quantity of invalid blocks.

23. The method of claim 22, further comprising:
  determining a second quantity of invalid blocks of the storage space that exceeds the threshold quantity of invalid blocks, wherein reassigning the valid block comprises reassigning a second quantity of valid blocks of the write booster buffer and reassigning the invalid block comprises reassigning the second quantity of the invalid blocks of the storage space.

24. The method of claim 21, further comprising:
determining whether the write booster buffer includes one or more valid blocks that store portions of the information after reassigning the valid block to the storage space; and
reassigning, based at least in part on determining that the write booster buffer includes the one or more valid blocks, a second set of valid blocks from the write booster buffer to the storage space and a second set of invalid blocks from the storage space to the write booster buffer.

25. The method of claim 21, further comprising:
entering, by the memory device, a state associated with performing a flush operation associated with the command to transfer the information from the write booster buffer to the storage space based at least in part on receiving the command, wherein reassigning the valid block and the invalid block is based at least in part on entering the state.

\* \* \* \* \*